United States Patent [19]

Pyves

[11] 4,281,023
[45] Jul. 28, 1981

[54] SOLUBLE COFFEE PROCESS

[75] Inventor: Richard R. Pyves, Pointe Claire, Canada

[73] Assignee: General Foods Limited, Toronto, Canada

[21] Appl. No.: 122,226

[22] Filed: Feb. 19, 1980

[30] Foreign Application Priority Data

Nov. 28, 1979 [CA] Canada .................................... 342,742

[51] Int. Cl.³ .............................................. A23F 5/50
[52] U.S. Cl. .................................... 426/385; 426/387
[58] Field of Search ................................ 426/385, 387

[56] References Cited

U.S. PATENT DOCUMENTS

| 3,244,530 | 4/1966 | Byer et al. | 426/387 |
| 4,107,339 | 8/1978 | Shrimpton | 426/387 |

FOREIGN PATENT DOCUMENTS

1265206 3/1972 United Kingdom .

*Primary Examiner*—Joseph M. Golian
*Attorney, Agent, or Firm*—Thomas R. Savoie; Daniel J. Donovan

[57] ABSTRACT

A flavorful soluble coffee is obtained by first evaporatively concentrating a coffee extract and condensing the bulk evaporate which is then vacuum stripped to obtain a condensate of from 5% to 15% by weight of the bulk evaporate. The condensed strippings are added to the concentrated extract which is then dried.

7 Claims, No Drawings

SOLUBLE COFFEE PROCESS

TECHNICAL FIELD

This invention relates to the production of soluble coffee having a desirable flavor including the presence of green woody and nutty flavor notes. It has been known in the art that it is desirable to concentrate aqueous coffee extracts prior to drying the extract to a soluble powder. Evaporative concentration is an economical method for effecting such concentration; however, evaporative concentration has been regarded as a rigorous processing step. To date the prior art has adopted the approach, as shown in British Pat. No. 1,265,206 assigned to Proctor & Gamble Company, and U.S. Pat. No. 4,107,339 assigned to General Foods Corporation, of first removing and recovering aromatics from coffee extract prior to evaporatively concentrating the extract. The concentrated extract is then combined with the recovered flavorful fraction prior to drying.

Typically, the prior art has attempted to remove substantially all of the volatiles from the coffee extract by means of a vacuum stripping operation. The stripped extract is then further concentrated under substantial vacuum and thereafter combined with a desired fraction of the stripped volatiles. It has now been found that there are several advantages to initially, evaporatively concentrate the extract and then strip volatiles from the evaporative condensate. This new procedure may be particularly advantageous when processing blends which contain a high level (50% or more) low-grade coffees.

For the purpose of this invention, the flavor terms, "green woody" and "nutty", as defined by expert flavor panelists, are employed, respectively, to express the green flavor notes associated with raw vegetables and green coffee and the nutty flavor notes reminiscent of roasted nuts, slightly sweet and smooth.

For purposes of this invention, the term "low-grade" coffees are meant to include those coffees, such as Robustas coffee, low-quality naturals and low-quality and unwashed Arabicas, which produce brews having a bitter and/or rubbery flavor.

DISCLOSURE OF INVENTION

The present invention is directed to producing a soluble coffee having desirable nutty, and green woody notes and particularly with obtaining these notes in a soluble coffee obtained from a roasted and comminuted coffee blend which is relatively high in low-grade coffees.

An aqueous coffee extract having a soluble concentration of between 12% and 30%, by weight, typically between 15% and 25%, is fed from an extraction system, which may be of any type known to those skilled in the art, to a vacuum evaporator without being first subjected to any volatile stripping operation. The extract is evaporated at a temperature between about 35° C. and 80° C. (corresponding to an absolute pressure range of from about 40 to 360 mm of Hg.) to a solids concentration of between 35 and 55% by weight. The resulting evaporate is condensed in a suitable condensation system. This condensed bulk evaporate is then vacuum stripped and the strippings condensed in order to obtain a condensate of from 5% to 15% by weight of the bulk evaporate. The condensed strippings are then added back to the concentrated extract at a level of from about 0.2 to 0.60 kg. of condensate per kg. of soluble solids contained in the extract. The resulting mixture is then dried. The drying should be effected in a manner which retains a relatively large amount of volatiles, such techniques as freeze-drying, low-temperature spray drying and vacuum drum drying could be employed. The dry soluble coffee powder upon being reconstituted in hot water exhibits a pleasant soluble coffee flavor, including the presence of green woody and nutty flavor notes.

According to the process of this invention, a desired fraction of the volatiles contained in the extract is removed during the vacuum evaporation step. The use of a relatively high concentration temperature, say in excess of 70° C. will tend to remove essentially all of the volatiles contained in the extract and produce a concentrated extract having a relatively bland flavor. This may be desired when the extract is obtained from a coffee blend high in low-grade coffees. Lower concentration temperatures can be utilized when more of the medium and high temperature volatiles which are contained in the extract are desired in the final soluble coffee products.

The volatiles from the evaporator are condensed at a pressure at least as high as that present in the vacuum evaporator. The higher the condensation pressure, the more efficient the condensation will be and it may be desirable to condense at around atmospheric pressure or above. This condensate is now fractionated, such as by conventional stripping techniques, to volatilize a desired volatile fraction which will contain the green-woody and nutty notes but be relatively free of any objectionable notes, such as bitter or rubbery notes. This volatilized material is also condensed in an efficient manner.

Operating in accordance with the present invention enables a desirable volatile fraction to be obtained by stripping an aqueous solids-free liquid which contains both a relatively high concentration of volatiles and a full spectrum of volatiles. The process of this invention is seen to be a more controllable operation than attempting to strip a desirable volatile fraction from a coffee extract wherein the volatile concentration is quite dilute and volatiles can interact with extract solids. Another advantage of stripping evaporative condensate instead of coffee extract is that no solids are present in the condensate to foul the stripping unit.

As an example of the stripping efficiencies which may be realized as a result of the process of this invention, it is noted that when 100 kgs. of extract containing 15% solids is stripped to recover 5 kgs. of condensed stripping a 5% strip is obtained. If this extract is then concentrated to 50% solids and the condensate returned, the resulting extract for feed to a dryer will be 43% solids. If, in accordance with this invention, the extract is first concentrated to 50% and 5 kgs. of strippings are recovered from the 70 kgs. of bulk evaporate condensate a strip of 7.1% is obtained. A return of these strippings to the concentrated extract will produce the same 43% solids stream to the dryer. Since the stripping efficiency is directly related to the stripping level, it can be appreciated that the more than 40% increase in strip level shown in this example results in a significantly higher stripping efficiency. Alternatively, in lieu of obtaining higher stripping efficiencies it would be possible to reduce the absolute amount of the strip and subsequent addback while maintaining the same stripping efficiency. This approach may be desirable in order to provide greater latitude in manipulating the types of flavor volatiles obtained for addback.

BEST MODE OF CARRYING OUT THE INVENTION

A blend of roasted and ground coffee containing in excess of 50% (typically at least 70%) by weight low-grade coffees is extracted in a conventional, multi-stage, countercurrent, percolation system to yield an extract having a solids concentration from about 12% to 30% by weight and a roasted yield (wt. of solids/wt. of roasted coffee) in excess of 35%. This extract is then concentrated to between 35 to 55% solids in a single stage plate evaporator or a film-type evaporator in which the extract is subjected to a temperature between 35° C. and 80° C. and a pressure of between about 40 and 360 mm of mercury.

The vacuum evaporate is condensed preferably at a temperature between about 1° C. and 21° C. Vapors not condensed in the condensing system may be recovered using a liquid seal vacuum pump as the vacuum source. According to this procedure, uncondensed volatiles and non-condensible gases come into intimate contact with and are entrained in a stream of aqueous liquid which serves as a liquid seal in the vacuum pump. As a result of the increase in pressure that is exerted on the liquid as it passes through the pump, a very high percentage of the volatile flavors are absorbed and/or dissolved in the liquid stream. It would, of course, be possible to use all or a portion of the condensed evaporate as the liquid seal medium. Essence recovery using a liquid seal pump is more completely described in U.S. Pat. No. 3,248,233 assigned to Coca-Cola Company.

The condensed evaporate is vacuum stripped at a pressure below 400, preferably below 250, mm of mercury, preferably in a thin-film evaporator, for a period of time sufficient to remove from 5 to 15% by weight of the evaporate. These strippings are then condensed preferably at from 1° C. to 21° C. in any known manner including the aforementioned techniques used for condensing the vacuum evaporate. The condensed strippings are added to the concentrated extract at a level of from 0.2 to 0.6 the weight of soluble solids and the mixture is freeze-dried.

EXAMPLE 1

A roasted and ground coffee blend containing both Robustas and Milds coffees was extracted with 180° C. feed water in a percolation train of six conventional pressure extractors using a 2.5 draw-off factor. The extract achieved a roasted yield of 42.7% and a solids concentration of about 17.1% by weight. The extract was fed at a temperature of 31° C. to a single effect evaporator and concentrated to about 50% solids under an absolute pressure of 97 mm of Hg. The evaporate is then condensed. The evaporator condensate containing a large proportion of the flavorful components present in the original feed stream was collected in a tank for subsequent processing. The evaporator condensate was held at a low temperature of from 1.7 to 10° C. to minimize loss of the flavorful components. The evaporator condensate was then directed to another single effect evaporator in which 8.8% of the total condensate feed stream was vaporized under an absolute pressure of 389 mm of Hg. The enriched essence from the evaporator was cooled to a temperature of 3° C. and then was recombined with the cooled concentrated extract at 14.4° C. prior to drying. The enriched essence to solids ratio in the final mixed extract was 0.35 kgs. essence per kg. soluble solids. The fortified extract at a concentration of 42% w/w soluble solids was then dried utilizing low temperature spray drying conditions to minimize loss of the flavorful components.

EXAMPLE 2

A blend of Columbians and Robustas coffees was extracted in an extraction train of six conventional pressure extractors. The feed water temperature was 180° C. and a draw-off factor of 2.94 was utilized to obtain a roasted yield of 47.9%. This extract containing 16.2% by weight soluble solids was cooled to 23° C. and fed to a single effect evaporator where it was concentrated to 53% soluble solids under an absolute pressure of 51 mm of Hg. The evaporator condensate containing a large proportion of the flavorful components originally present in the extract feed stream was collected at 13° C. and fed to a second single effect evaporator. The evaporator condensate was vaporized under an absolute pressure of 189 mm. of Hg. whereby 11.3% of the evaporator condensate feed stock was collected. This enriched essence from the evaporator was cooled to 13° C. and then combined with the pre-cooled concentrated extract, also at 13° C. prior to drying. The stripped evaporator condensate is discarded as a waste stream having being depleted of the majority of the aromatic components. The enriched evaporator condensate to solids ratio in the final mixed extract was 0.590 kgs. essence per kg. soluble solids. The fortified extract at a concentration of 41% soluble solids was then dried utilizing low temperature spray drying conditions to minimize the loss of the flavorful components. The resultant spray dried powder was evaluated by an expert panel of coffee flavor tasters and the final product was described as having a strong aromatic cup reminiscent of RG flavor and having groundsy and green-woody flavor notes.

I claim:
1. A method for producing a soluble coffee product comprising the steps of:
    (a) obtaining an aqueous extract of roasted coffee, said extract having a soluble solids concentration of from 12% to 30% by weight,
    (b) concentrating said extract to a solids concentration of from 35 to 55% by weight in a vacuum evaporator at a temperature between 35° C. and 80° C. and a pressure of between 40 and 360 mm of mercury,
    (c) condensing the vacuum evaporate,
    (d) vacuum stripping the condensed evaporate at a pressure below 400 mm of mercury and condensing said strippings in order to obtain a condensate of from 5 to 15% by weight of the condensed evaporate,
    (e) adding the condensed stripping to the concentrated extract at a level of about 0.2 to 0.60 kgs. of condensate to one kg. of extract solids, and
    (f) drying the mixture from step (e).
2. The method of claim 1 wherein the mixture of (e) is dried by freeze-drying.
3. The method of claim 1 wherein the mixture of (e) is dried by low-temperature spray drying.
4. The method of claim 1 wherein the aqueous extract is obtained from a blend of roasted and ground coffee which contains low-grade coffee in an amount of at least 50% be weight.
5. The method of claim 4 wherein the level of low-grade coffee is at least 70% by weight.
6. The method of claim 4 wherein the coffee blend is extracted to obtain a roasted yield in excess of 40% by weight.
7. The method of claim 4 wherein the extract is concentrated at a temperature in excess of 70° C.

* * * * *